United States Patent [19]

Koster et al.

[11] Patent Number: 5,296,147
[45] Date of Patent: Mar. 22, 1994

[54] METHOD FOR PROCESSING MANURE, FERMENTED MANURE AND AMMONIUM NITROGEN CONTAINING WASTE WATER

[75] Inventors: Iman W. Koster; Abraham Klapwijk, both of Bennekom, Netherlands

[73] Assignee: Ecotechniek B.V., Utrecht, Netherlands

[21] Appl. No.: 70,112

[22] Filed: Jun. 1, 1993

Related U.S. Application Data

[62] Division of Ser. No. 599,345, Oct. 17, 1990, Pat. No. 5,232,583.

[30] Foreign Application Priority Data

Oct. 17, 1989 [NL] Netherlands ............ 8902573

[51] Int. Cl.$^5$ .............................................. C02F 3/30
[52] U.S. Cl. .................................. 210/605; 210/614; 210/631; 210/903; 210/906
[58] Field of Search ............... 210/605, 614, 621–631, 210/903, 906, 150, 151, 96.1, 195.1, 146, 201–203, 205, 218, 252, 259

[56] References Cited

U.S. PATENT DOCUMENTS

| | | | |
|---|---|---|---|
| 4,160,724 | 7/1979 | Laughton | 200/903 |
| 4,183,810 | 1/1980 | Baenens et al. | 210/614 |
| 4,384,956 | 5/1983 | Mulder | 210/903 |
| 4,818,407 | 4/1989 | Bogusch | 210/614 |
| 4,818,408 | 4/1989 | Hamamoto | 210/614 |
| 5,182,021 | 1/1993 | Spector | 210/605 |
| 5,196,111 | 3/1993 | Nicol et al. | 210/96.1 |
| 5,213,681 | 5/1993 | Kos | 210/605 |
| 5,242,592 | 9/1993 | Ballnus | 210/605 |

FOREIGN PATENT DOCUMENTS

| | | |
|---|---|---|
| 0327184 | 8/1989 | European Pat. Off. |
| 3605962 | 8/1987 | Fed. Rep. of Germany |
| 56-053795 | 5/1981 | Japan |
| 58-098195 | 6/1983 | Japan |
| 63-302996 | 12/1988 | Japan |
| 8600396 | 9/1987 | Netherlands |
| 2099807 | 12/1982 | United Kingdom |

OTHER PUBLICATIONS

J. M. Engasser, "Bioreactortechnolgie: Ontwerp en Optimalisatie van Reactoren met Levende Cellen," PT Procestechniek, Jun./Jul. 1989, pp. 56–63.

A. Klapwijk, "Eliminatie van Stikstof uit Afvalwater Door Denitrificatie," 1978, p. 99.

*Primary Examiner*—Thomas Wyse
*Attorney, Agent, or Firm*—Harness, Dickey & Pierce

[57] ABSTRACT

The invention relates to a method for processing manure, fermented liquid manure being subjected to nitrification in a first step and to denitrification in a subsequent step, an aerated reactor which contains active sludge rich in nitrifying bacteria being used in the nitrification step and acid-neutralizing chemicals being added to said reactor if necessary and a continuously fed upflow sludge bed (USB) reactor which contains a very compact biomass which is capable of converting nitrate to nitrogen gas and to which an organic substrate is added being used in the denitrification step, the loading of the reactor being controlled to obtain an optimum nitrification and denitrification and this is obtained on the basis of one or more of the following data:

the incoming nitrogen load;
the information from the WAZU respiration meter;
the pH in the nitrification reactor, the criterion for which is that the pH is in the range limited by 6 and 8.5;
the temperature in both the nitrification reactor and the denitrification reactor is kept below 40° C.;
the concentration of oxidized nitrogen in the influent for the denitrification reactor, the criterion for which is that the concentration is between 0 and 4 g N/l;
the concentration of oxidized nitrogen in the nitrification reactor, the criterion for which in the sludge/liquid mixture in the reactor is that the concentration is between 0 and 4 g N/l;
the concentration of the carbon source in the effluent from the denitrification reactor;
the gas production in the denitrification reactor. The invention further relates to an apparatus for performing this method comprising at least one WAZU respirator meter.

21 Claims, 6 Drawing Sheets

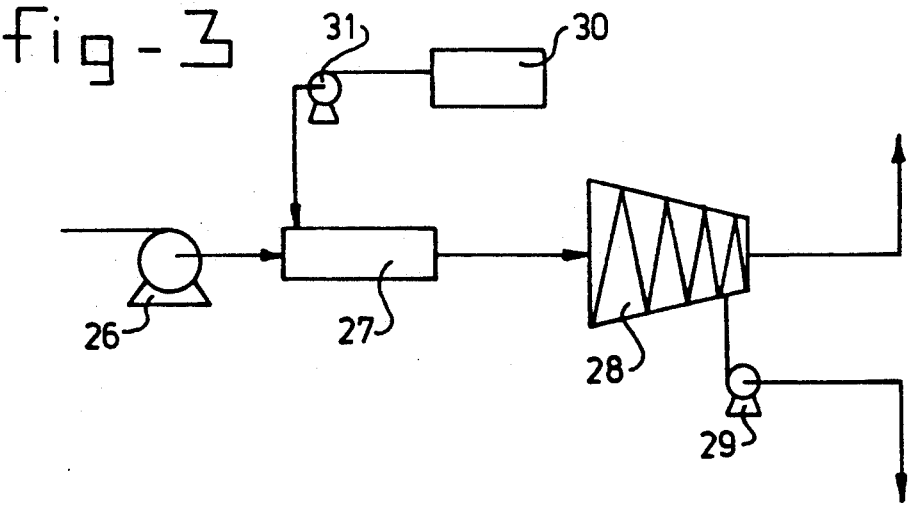
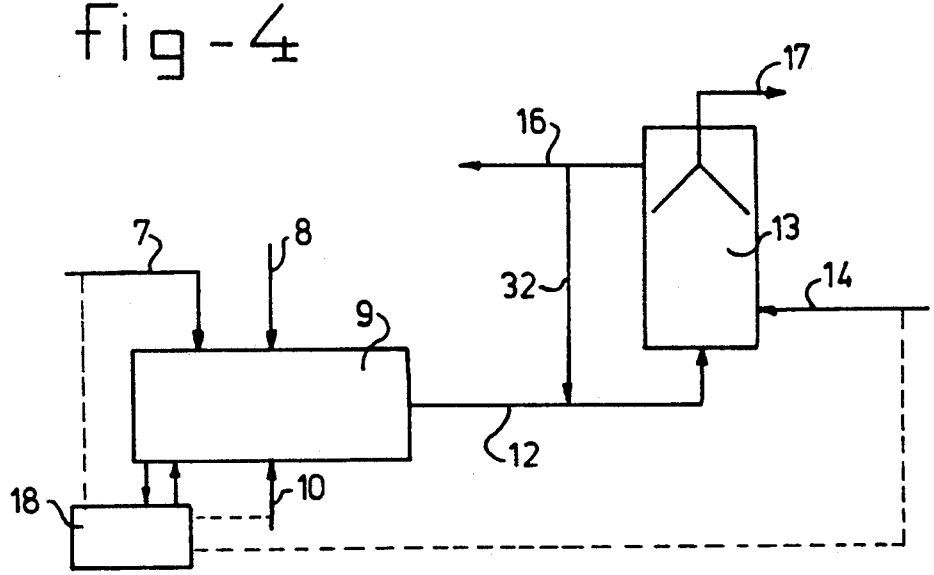
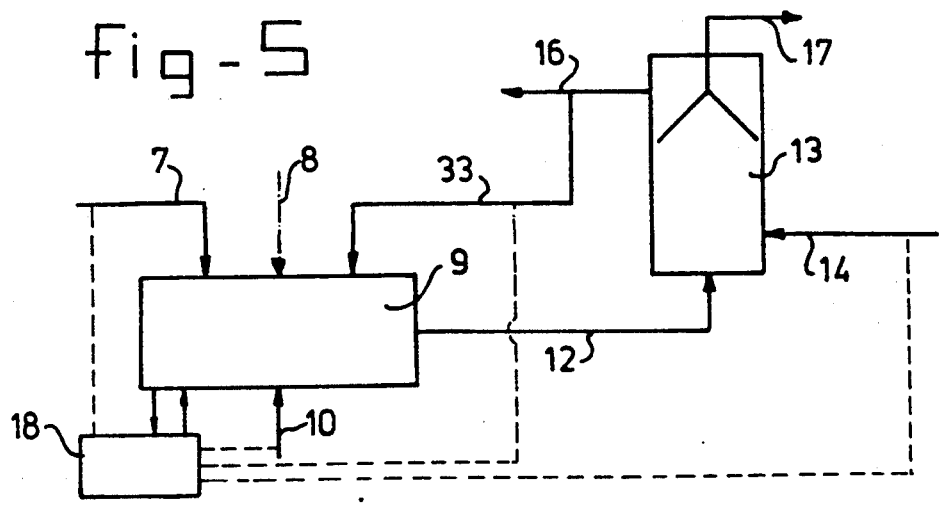

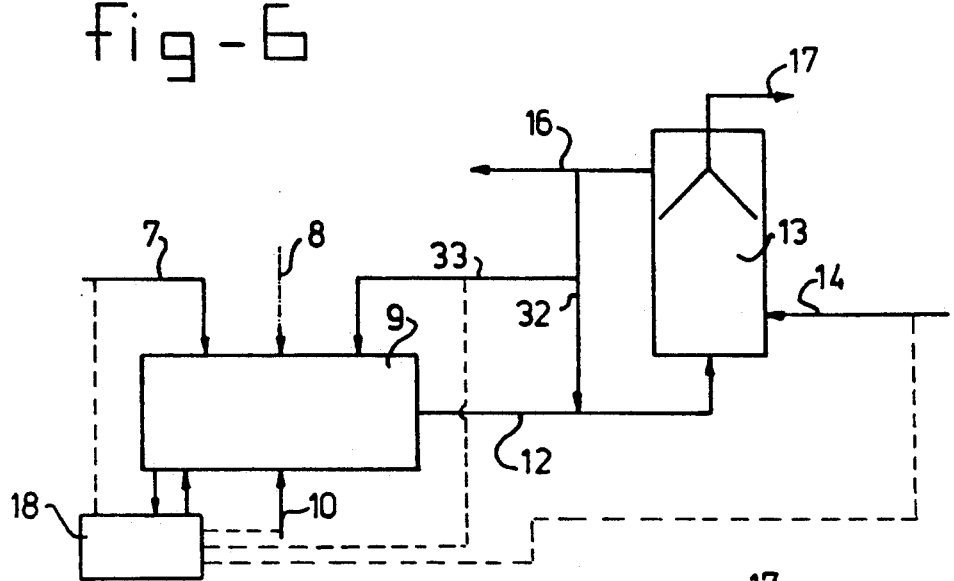
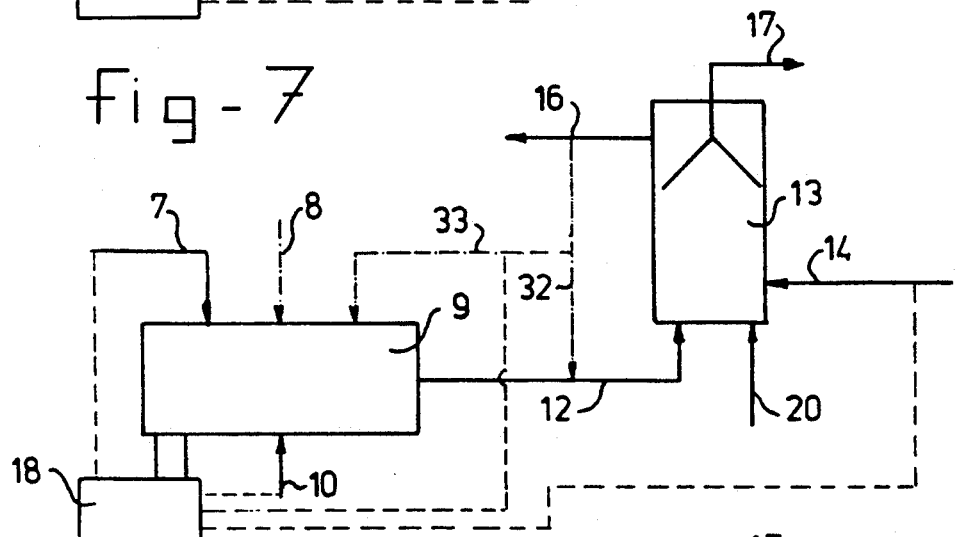
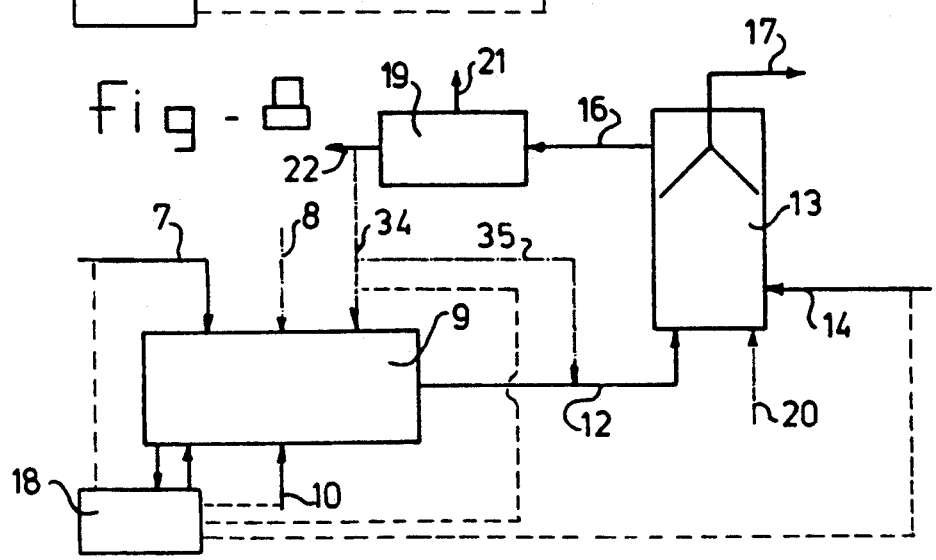

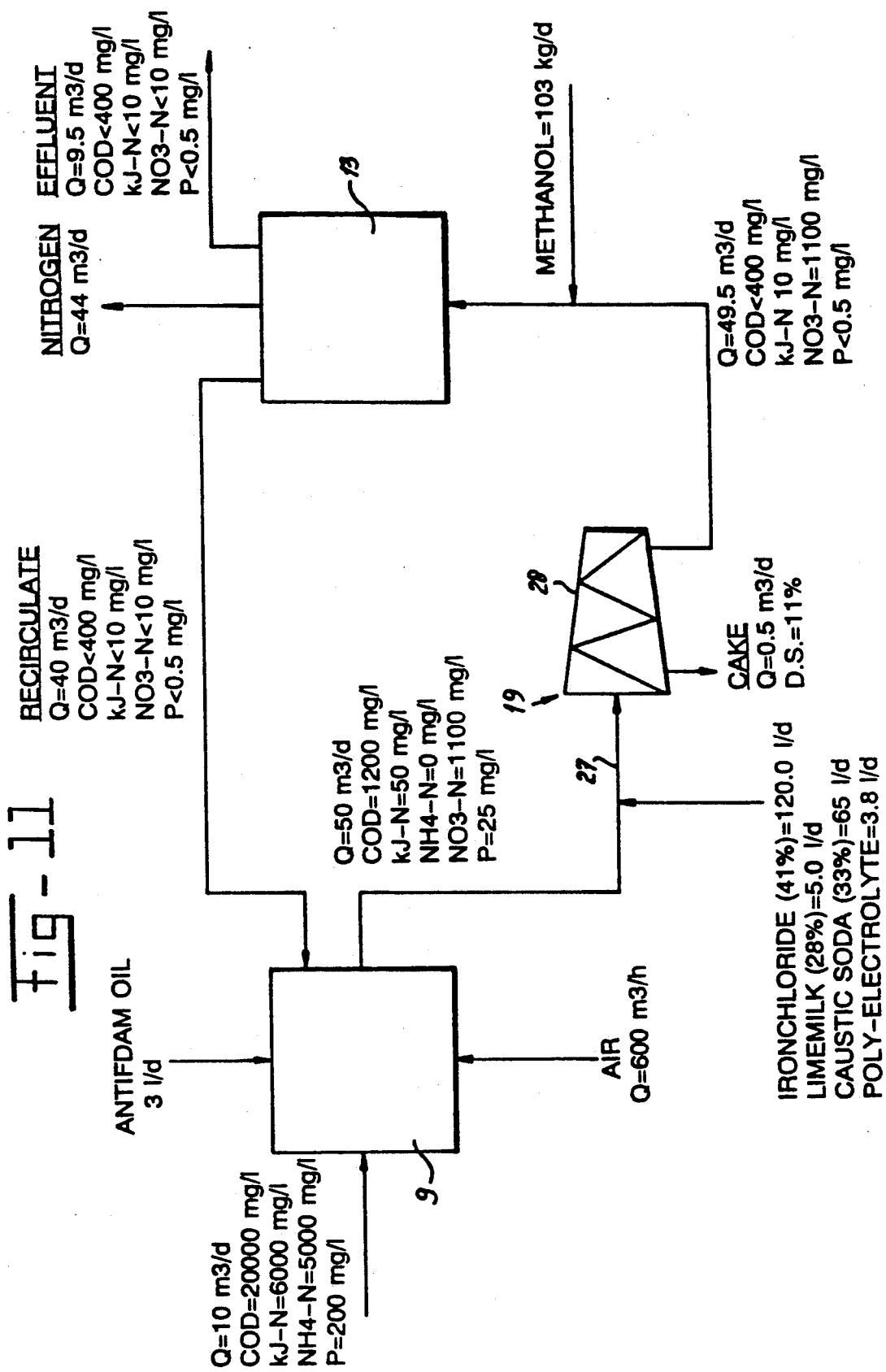

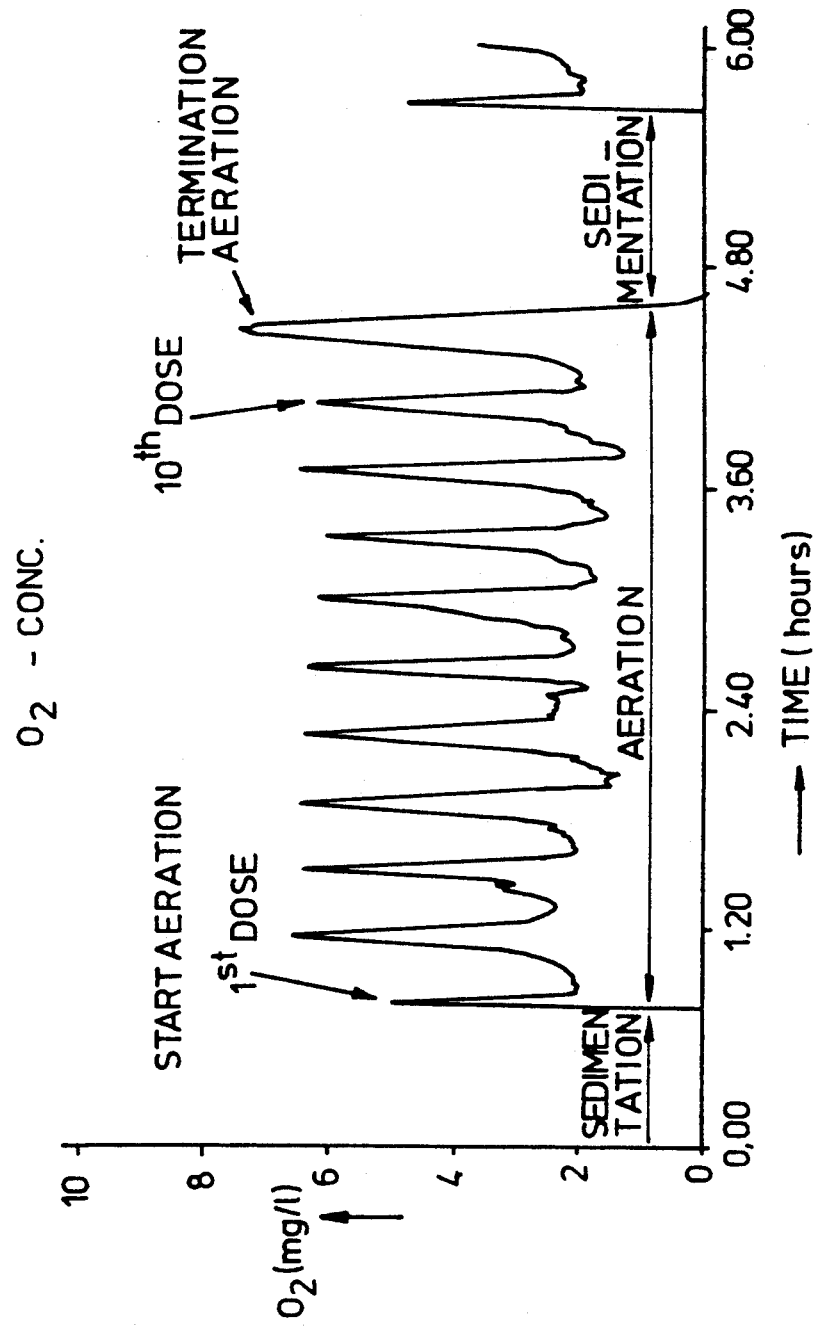

METHOD FOR PROCESSING MANURE, FERMENTED MANURE AND AMMONIUM NITROGEN CONTAINING WASTE WATER

This is a division of U.S. patent application Ser. No. 07/599,345, filed Oct. 17, 1990, U.S. Pat. No. 5,232,583.

BACKGROUND OF THE INVENTION

The present invention relates to a method for processing manure, fermented manure or waste water having a relatively high ammonia nitrogen concentration, said liquid manure being subjected to nitrification in a first step and to denitrification in a subsequent step, an aerated reactor which contains active sludge rich in nitrifying bacteria being used in the nitrification step and acid-neutralizing chemicals being added to said reactor if necessary and a continuously fed upflow sludge bed (USB) reactor which contains a very compact biomass which is capable of converting nitrate to nitrogen gas and to which an organic substrate is added for use in the denitrification step.

A method of this type is known from, inter alia, Agrarisch Dagblad of Mar. 14, 1988. With this method the liquid fraction of fermented semi-liquid manure is treated. The biologically degradable organic substances, nitrifiable nitrogen and phosphorus which are present in the liquid fraction of anaerobic or fermented semi-liquid manure can be largely removed. The method essentially consists in a coupling of a nitrification step in a nitrification reactor in which ammonia is converted by bacteria to oxidized nitrogen with a denitrification step in a denitrification reactor in which oxidized nitrogen is converted by bacteria to nitrogen gas, the phosphate present in the liquid being concentrated as a chemical precipitate in the reactor at the same time. Oxidation of ammonia results in lowering of the pH, which, with this method, can be countered by metering in lime and/or metering in effluent from the denitrification reactor (recycling) to the nitrification reactor. During the nitrification step of this method there will also be some removal of nitrogen and phosphate since the bacteria degrade biologically degradable substances which have passed through the fermentation to give $CO_2$ and $H_2O$. The nitrogen and phosphorus thus liberated can be incorporated in the new cells of the active sludge. With this method the nitrification reactor (which can be either a fed batch reactor or a batch reactor) is operated batchwise. It is then aerated until all ammonia has been nitrified, after which the aeration is stopped temporarily in order to allow the sludge to settle. The nitrified liquid manure is run off for treatment in the denitrification step, while the active sludge remains behind in the nitrification reactor for a subsequent cycle. In the denitrification step the effluent from the nitrification reactor is pumped upwards through a USB (upflow sludge bed) reactor. In this reactor there is a very compact biomass which is capable of converting nitrate to nitrogen gas. In order to allow this step to proceed, an organic substrate—for example methanol—must be added to the reactor. Acid is consumed during the denitrification step, as a result of which the pH in the bacterial bed rises. As a consequence of this rise, an insoluble precipitate of phosphate, with the calcium ions present in the liquid, forms. The manure processing consisting of manure fermentation and separation of fermented manure, followed by the method for treatment of the liquid fraction of fermented semi-liquid manure, which has been described above, and is shown in FIG. 1.

A number of manure processing works are being developed at present, for example Promest in Helmond and Memon in Deventer. In these works semi-liquid manure is evaporated to give a dry product, which costs a great deal of energy since semi-liquid manure consists of more than 90% of water. Moreover, this evaporation is a complex technology which in fact still has to be developed for use on manure. The cost price of processing of this type for the formation of dry granular or powder manure is consequently very high.

An approach which differs from that described above is the treatment of semi-liquid manure in conventional effluent treatment installations. Currently this is also being used for treatment of liquid manure from calves. The conventional manure treatment has the significant disadvantages that the process produces a large amount of sludge (excess bacteria) and that the process is not capable of removing the phosphate. This means that extra provisions have to be made for sludge treatment and dephosphating. A conventional manure treatment also requires a fairly large amount of space.

This method, as reported in Agrarisch Dagblad of Mar. 17, 1988, has the advantage that it is relatively inexpensive and can be carried out in a compact installation. However, a number of problems also arise in this case in the treatment of fermented manure.

A compact manure treatment installation for manure and fermented manure or ammonium nitrogen containing waste water can be produced and maintained only if:

a) the metering of the fermented liquid fraction is matched to the nitrification capacity of the nitrification reactor. The nitrification reactor must not be overloaded but must also not operate underloaded.

b) The metering of methanol (or other sources of carbon) to the denitrification reactor is matched to the nitrate load in the denitrification reactor. In the case of undermetering not all nitrate is removed; in the case of overmetering, however, methanol (or other source of carbon) is present in the effluent to be discharged.

c) The effluent recycling from denitrification reactor to nitrification reactor is controlled such that it is optimal. Too little recycling leads to a nitrate concentration which has an inhibitory action on the bacteria; too much recycling has the consequence that the reactor is filled mainly with liquid which has already been treated.

Said points can be achieved by the use of separate instruments, it being necessary to carry out some of the diverse operations by hand. Moreover, the results of the various measurements cannot be integrated and translated into a control action without the intervention of one operator. Furthermore, the effluent from the nitrification reactor can still contain organic substances which cannot be further degraded in the nitrification reactor. Organic material which passes into the denitrification reactor can be converted into inorganic material in that reactor with the liberation of ammonium nitrogen which is then (insofar as it is not fed via the recycle stream) discharged with the effluent.

SUMMARY OF THE INVENTION

The aim of the present invention is to eliminate these problems. The present invention relates to a method of the type indicated in the preamble which is characterized in that the loading of the nitrification reactor is controlled and the optimum nitrification and denitrification are obtained on the basis of one or more of the following data:

the incoming nitrogen load;

the information from the WAZU respiration meter (Netherlands Patent Application No. 8600396, filed on Feb. 17, 1986);

the pH in the nitrification reactor, the criterion for which is that it is in the range limited by 6 and 8.5 and preferably in the range of 6.5 to 7.5;

the temperature in both the nitrification reactor and the denitrification reactor, the criterion for which is that this is lower than 40° C. and preferably in the range of 25° C. to 35° C.;

the concentration of oxidized nitrogen in the influent for the denitrification reactor, the criterion for which is that the concentration is between 0 and 4 g N/l;

the concentration of oxidized nitrogen in the nitrification reactor, the criterion for which in the sludge/liquid mixture in the reactor is that the concentration is between 0 and 4 g N/l;

the concentration of the carbon source in the effluent from the denitrification reactor;

the gas production in the denitrification reactor.

In particular the present invention relates to a method of the type indicated in the preamble which is characterized in that a) the loading of the nitrification reactor is controlled to obtain an optimum nitrification and denitrification, said optimum being obtained on the basis of the following data:

the incoming nitrogen load (by controlling the fermented liquid manure);

the incoming oxygen load (by controlling aeration);

the information from the WAZU respiration meter or the information of an oxygen determination in the nitrification reactor;

the concentration of oxidized nitrogen in the nitrification reactor, said concentration in the sludge/liquid mixture in the reactor being maintained between 0 and 4 g N/l by adjusting one or more of the ratio of the influent flow (the fermented liquid manure), and the recirculation flow and b) the loading of the denitrification reactor is controlled to obtain an optimum denitrification, said optimum being obtained by:

maintaining the concentration of oxidized nitrogen in the influent for the denitrification reactor between 0 and 4 g/N/l;

maintaining the incoming oxidized nitrogen load, below or equal to the nitrate removal capacity so the nitrate concentration in the effluent is below the allowable concentration, and optionally further controlling the denitrification on the basis of one or more of the gas production in the denitrification reactor and the nitrate effluent concentration;

supplying an amount of organic substrate calculated from one or more of the incoming oxidized nitrogen load, the gas production in the denitrification reactor and the nitrate concentration of the effluent of the denitrification reactor, preferably from at least the incoming oxidized nitrogen load and c) the temperature in both the nitrification reactor and the denitrification reactor is maintained below 40° C. (preferably 25° C.–35° C.) and d) the pH-value in the nitrification reactor is maintained in the range of 6 to 8.5 (preferably 6.5-7.5).

BRIEF DESCRIPTION OF THE DRAWINGS

FIG. 3 is a schematic illustrating a physical/chemical flocculation step and separation of the floccule;

FIG. 4 illustrates a process flow schematic of a further embodiment of the present invention;

FIG. 5 illustrates a slightly modified, different embodiment of the process of the present invention similar to that illustrated in FIG. 4;

FIG. 6 illustrates a slightly modified, different embodiment of the process of the present invention similar to that illustrated in FIGS. 4 and 5;

FIG. 7 illustrates a slightly modified, different embodiment of the process of the present invention similar to that illustrated in FIGS. 4, 5 and 6;

FIG. 8 illustrates a slightly modified, different embodiment of the process of the present invention similar to that illustrated in FIGS. 4–7;

FIG. 11 illustrates a process flow, mass balance schematic of the process of the present invention; and FIG. 12 illustrates a process cycle for the process of the present invention, including a plot of dissolved oxygen versus time for a single treatment cycle.

DESCRIPTION OF THE PREFERRED EMBODIMENT

Figure 1:
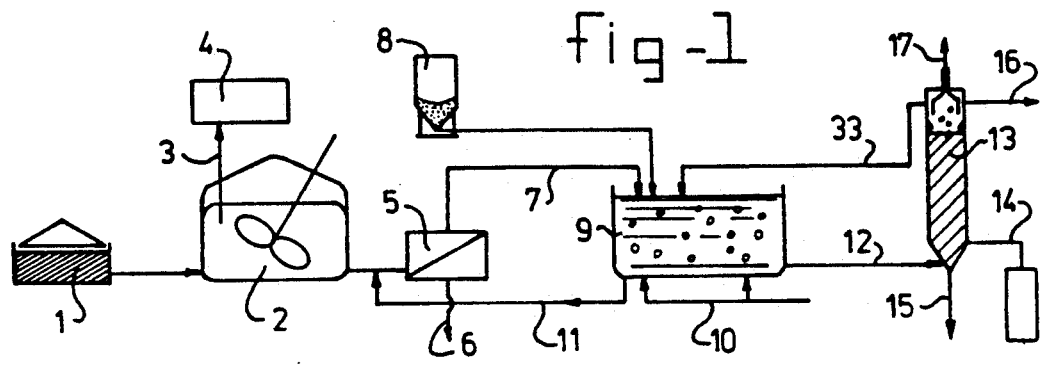
FIG. 1 is a process flow schematic of the prior art process for a method for treatment of semi-liquid manure.
Figure 2:
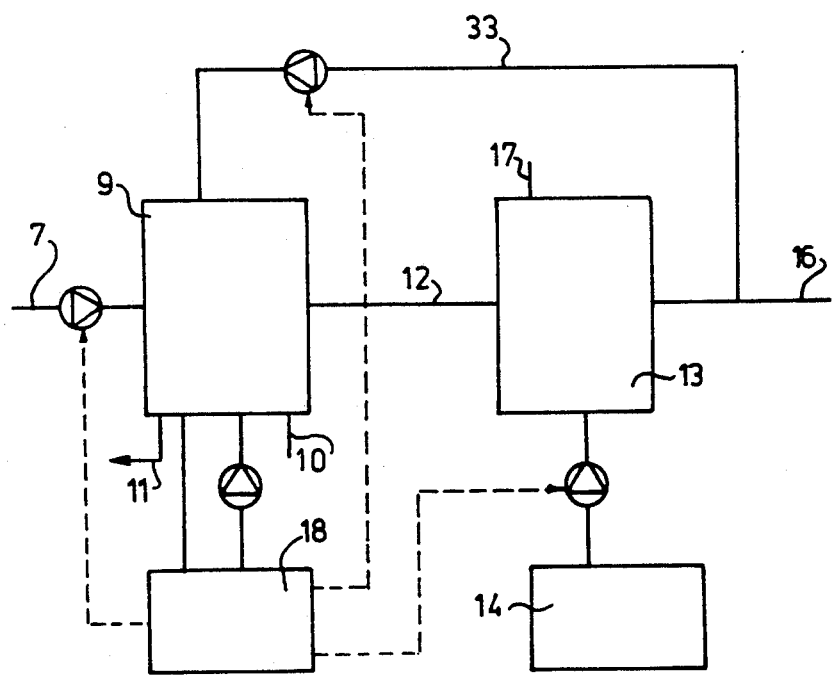
FIG. 2 illustrates a control schematic of the WAZU respiration meter utilized in an embodiment of the present invention.

An important aspect of the invention is the use of one instrument, a respiration meter (WAZU respiration meter), with which the time at which the treatment processes are complete is established and with which both ammonium nitrogen concentration in the liquid fraction of fermented manure to be treated and the nitrate concentration of the effluent from the nitrification reactor (=feed for the denitrification reactor) can be calculated. The liquid streams and control lines in relation to the respiration meter are shown schematically in FIG. 2. As is apparent from the figure, the use of nitrogen gas production for controlling the amount of organic substrate to be metered is optional. It is possible to use solely the incoming oxidized nitrogen load to meter the amount of organic substrate as can be seen where the control line runs from the incoming oxidized nitrogen line to the WAZU respiration meter. The option whereby the control line runs to the WAZU respiration meter from the nitrogen gas production is not indicated in the Figure. The scale of the plant will determine which option to use. For large scale production, measurement of the nitrogen gas production is not economically feasible so preferably the incoming oxidized nitrogen load will be used. It is also possible to use both measurements. A person skilled in the art will be able to ascertain which option to use. The respiration meter can control the entire method automatically on the basis of the data collated and calculated by the instrument.

Another aspect of the invention is the use of a separation step, e.g. a physical/chemical flocculation step and a floccule separator or a membrane technology before or after the denitrification step. Purpose of said separation previous to the denitrification reactor is catching suspended and colloidally dissolved organic substances, that otherwise would minerallize in the denitrification reactor resulting in the formation of ammoniun nitrogen. A physical/chemical flocculation step plus floccule separation is shown schematically in FIG. 3. The residual organic substance can be removed from the effluent with the aid of flocculating auxiliaries and a process for separation of the flocculant from the effluent. By positioning upstream of the denitrification step, the organic substances can be removed before they are converted to inorganic substances and ammonium nitrogen is formed. A further advantage of this is that the carbonate content in the effluent from the nitrification reactor is low (lower than in the effluent from the denitrification reactor, to which organic substrate is added). This is advantageous if a flocculating auxiliary is used which forms a precipitate with carbonate, such as, for example, iron chloride. If a flocculating auxiliary is used which contains cations which precipitate with phosphate, an additional phosphate treatment takes place.

Furthermore, the optimum conditions for the present treatment methods have been investigated in both the nitrification and the denitrification reactor. The biomass in both the nitrification reactor and the denitrification reactor produce heat. Because of the high concentration of biomass and the high rates of conversion which are realized in both reactors, there will be a net excess of heat in both reactors if no measures are taken. It is known, from observations made by the Applicant in laboratory experiments, that for a nitrifying bacterial population the optimum temperature of this bacterial population is between 31° and 35° C. and that the maximum temperature which can be tolerated is 40° C. On the basis of general scientific information, it can be anticipated that the same temperature limits apply for the denitrifying bacterial population. Thermophilic denitrifying bacteria are known. These operate at temperatures above about 50° C. However, for various reasons it is not desirable to use thermophilic organisms in the denitrification reactor: the effluent to be discharged will be much too warm and the recycle stream to the nitrification reactor may not be too warm. Both the nitrification and the denitrification reactor can be operated only if there is provision for removal of heat from the respective reactor contents. The temperature also influences the solubility of oxygen in water. A higher temperature leads to lower solubility of oxygen and therefore leads to increased need for aeration. Increased aeration can result in undesirable foam formation, the amount of foam formation being dependent, e.g., on protein content of the liquid to be treated.

For the present method, the conditions in the denitrification reactor must be kept such that phosphate can precipitate. The efficiency of the phosphate removal is dependent on the pH and the $HCO_3^-/CO_3^{2-}$ ratio in the denitrification reactor.

The desired pH can be obtained by using an organic C source for the denitrification reactor with a specific chemical oxygen consumption (COC)/total organic carbon (TOC) ratio in the present method. The fact is that alkalinity (alkali, bicarbonate and carbonate) is produced in the denitrification reactor under the influence of the denitrification reaction. The production of alkalinity is dependent on the COC/TOC ratio of the organic C source in the denitrification reaction. Usually methanol is used as organic C source. Methanol has a high COC/TOC ratio and results in a higher production of alkalinity than, for example, glucose, which has a much lower COC/TOC ratio. Experiments have shown that the COC/TOC ratio must be 3.75 or more.

As stated, the pH value falls in the nitrification reactor on the oxidation of the ammonia. To counter acidification of the reactor, an alkali can be metered in or effluent can be recycled from the denitrification reactor to the nitrification reactor. It has been established experimentally that the concentration of oxidized nitrogen in the nitrification reactor in the sludge/liquid mixture is between 0 and 4 g N/l and preferably is in the range limited by 0 and 1.5 g N/l. Furthermore, it has been found that the concentration of oxidized nitrogen in the influent for the denitrification reactor is between 0 and 4 g N/l and is preferably between 1.0 and 1.4 g N/l. In order to achieve this, the effluent from the denitrification reactor can be recycled. This recycling provides dilution of the concentration of oxidized nitrogen at the feed location in the reactor. Furthermore, this recycling is intended to obtain a higher stream velocity in the denitrification reactor, which promotes the contact between biomass and substrate in the reactor. Recycling can take place directly from effluent stream to influent stream for the denitrification reactor. It is, however, also possible (and in fact better for the overall process) for recycling of effluent from the denitrification reactor to be used, this recycling taking place entirely or partially via the nitrification reactor see, e.g., FIG. 5. The aim of this is then to achieve both a saving in the chemicals consumption for pH control in the nitrification reactor and to achieve a dilution of the reactor contents of the nitrification reactor such that the content of oxidized nitrogen is always lower than 4 g N/l.

The present invention also relates to an installation which is suitable for carrying out the method as described above, comprising:

a nitrification reactor which is provided with an aeration, feed of liquid to be treated, feed of acid-neutralizing chemicals, active sludge rich in nitrifying bacteria, a sludge discharge, an effluent discharge;

a line through which the effluent from the reactor can be fed to the denitrification reactor;

a denitrification reactor which is provided with a feed of effluent from the nitrification reactor, feed of a carbon source, an upflow sludge bed (USB) column, a very compact biomass capable of converting nitrate to nitrogen gas, a discharge of phosphate-rich sludge discharge, an effluent discharge, a nitrogen gas discharge;

a line through which the effluent from the denitrification reactor can be discharged, which is characterized in that the installation (shown schematically in FIG. 2) is provided with one or more WAZU respiration meters (18) controlling the aeration (10), the liquid supply to be treated (7), the sludge discharge (11) of the nitrification reactor and the supply of the source of carbon (14).

In the most simple form, the installation (shown schematically in FIG. 2) consists of the combination of a batch reactor (to which all influent (7) is added at once per cycle) or a fed batch reactor (to which the influent is added gradually or stepwise per cycle) as nitrification reactor (9) and a continuously fed upflow slib bed (USB) reactor as denitrification reactor (13). The two reactors are operated connected in series, without by-pass of the nitrification reactor (9) but optionally with backmixing (33) from the denitrification reactor (13) to the nitrification reactor (9).

The use of the WAZU respiration meter (18) (Netherlands Patent Application 86.00396, filed on Feb. 6, 1986 & EP-A 257057), a measurement and control unit with which the course of the respiration rate of the biomass in the reactor (9) is followed, is characteristic of the installation according to the present invention.

The nitrification reactor (9) of the installation is provided with aeration (10), a feed of liquid (7) to be treated, a sludge discharge (11) and optically a feed of effluent from the denitrification reactor (33), all of which are controlled by the WAZU respiration meter (18) (Netherlands Patent Application 86.00396, filed on Feb. 6, 1986). This respiration meter also controls the metering of the source of carbon (14) for the denitrification reactor (13). This denitrification reactor is additionally provided with nitrogen gas discharge (17) and effluent recirculation (33) or discharge (16).

Another embodiment of the installation according to the invention (shown schematically in FIG. 4) is also provided with a line (32) through which the effluent from the denitrification reactor (13) can be partially recycled to the influent (12) for the denitrification reactor (13) and additionally this installation is provided with a feed of one or more acid-neutralizing chemicals (8) to the nitrification reactor (9).

Furthermore, the installation can comprise a combination of the two above installations (FIGS. 4 and 5), i.e. an installation as shown in FIG. 6, this installation being provided with a line through which the effluent (32, 33) from the denitrification reactor (13) can be partially recycled (33 and 32 respectively) to the nitrification reactor (9) and to the influent (12) for the denitrification reactor (13).

The three lastmentioned installations, shown in FIGS. 4, 5 and 6, can comprise a further addition (see FIG. 7) in the form of a feed of chemicals for phosphate precipitation (20).

Furthermore, all of these installations (shown in FIGS. 4, 5, 6 and 7) can be provided with one or more flocculation installations (19). The flocculation installation as such is shown schematically in FIG. 3.

FIG. 3, an influent pump 26 feeds into a static mixer and/or flocculating tank 27. An iron chloride storage tank 30 feeds a metering pump 31, which in turn supplies a metered amount of iron chloride into tank 27. Tank 27 is feedably connected into a centrifuge 28. Centrifuge 28 has an outlet indicated by the upwardly directed arrow and a second outlet connected to sludge pump 29. The output of sludge pump 29 is indicated by a downwardly connected arrow.

Figure 9:
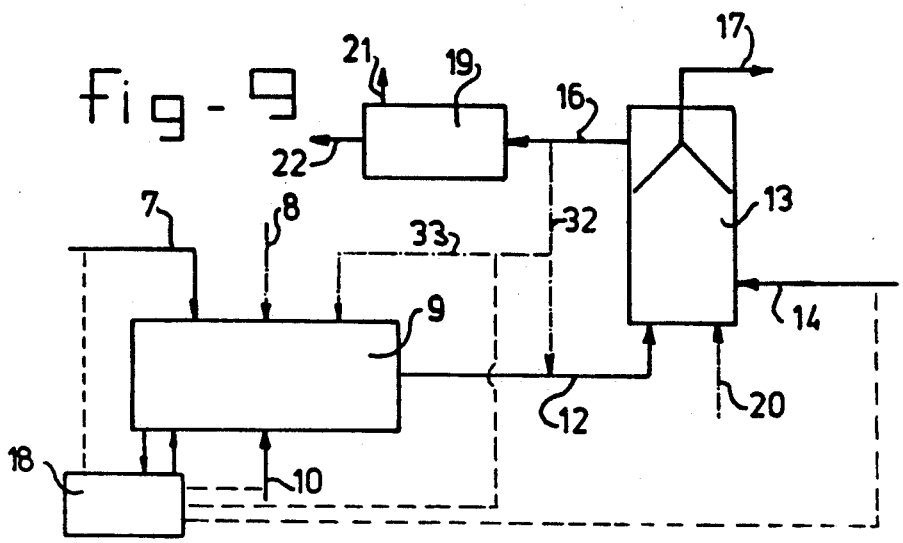
FIG. 9 illustrates a slightly modified, different embodiment of the process of the present invention similar to that illustrated in FIGS. 4–8.
Figure 10:
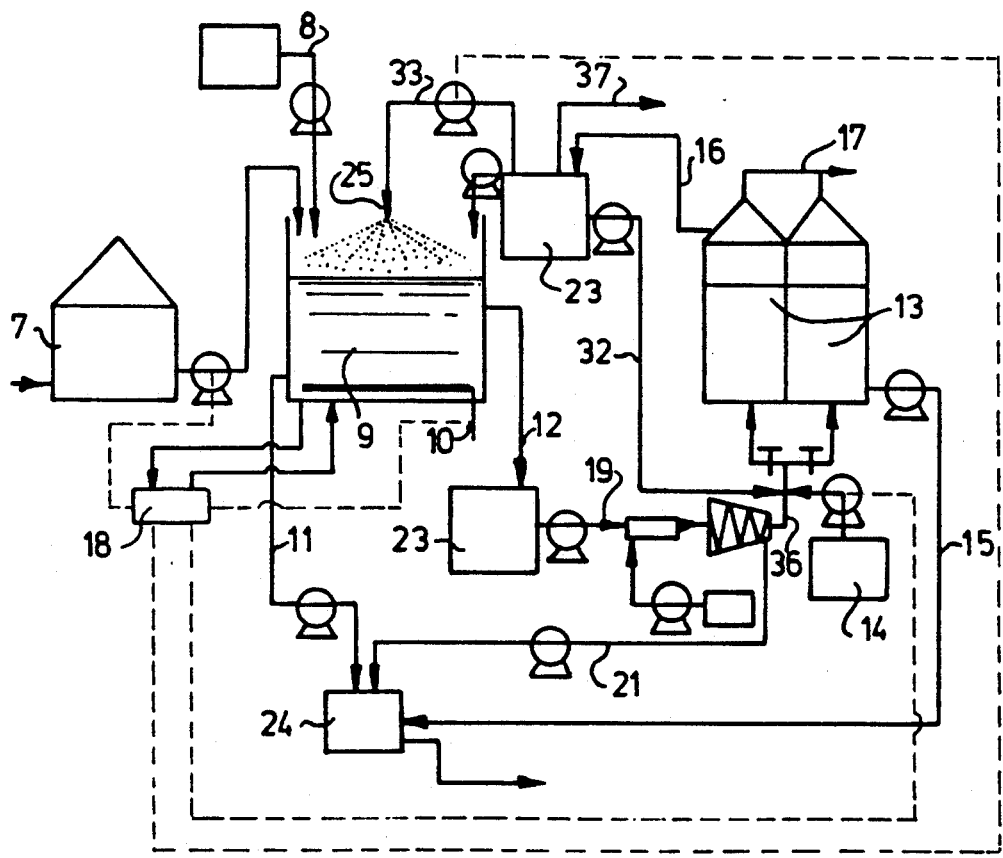
FIG. 10 is a process flow schematic diagram illustrating in more detail the preferred embodiment of the present invention.

The installations according to the invention which have already been described can be provided with the flocculation installations at various locations (FIGS. 8, 9 and 10). In the installation according to FIG. 8, the flocculation installation (19) is positioned in such a way that the effluent (16) from the denitrification reactor (13) flows through the flocculation installation (19), shown in detail in FIG. 3 upstream of the recycle (34, 35) or discharge (16).

In the installation according to FIG. 9, the flocculation installation (19) is positioned in such a way that only the effluent (16) from the denitrification reactor (13) which is to be discharged flows through the flocculation installation (19).

In the installation according to FIG. 10, which is preferred, the flocculation installation (19) is positioned in such a way that the effluent (12) originating from the nitrification reactor (9) flows through the flocculation installation (19) before it flows into the denitrification reactor (13).

The installations according to the invention in which the nitrification reactor is provided with feed of the effluent (16, 33, 34) from the denitrification reactor (13) can be provided with a spray installation (25 and FIG. 10) through which the effluent (16, 33, 34) from the denitrification reactor (13) can be sprayed into the nitrification reactor (9) to prevent foam formation.

Furthermore, all installations according to the invention can be provided with one or more buffer tanks (23 and FIG. 10). The examples given serve to illustrate the invention and must not be regarded as restrictive.

EXPLANATION OF THE NUMERALS IN THE FIGURES

1. Storage of semi-liquid manure
2. Fermentation installation
3. Biogas
4. Installation for energy generation
5. Installation for mechanical separation
6. Cake
7. Filtrate=liquid fraction to be treated
8. Holder for metering acid-neutralizing chemicals
9. Nitrification reactor
10. Air supply
11. Sludge discharge
12. Effluent from the nitrification reactor
13. Denitrification reactor
14. Holder for metering C source
15. Phosphate-rich sludge
16. Effluent from the denitrification reactor
17. Nitrogen gas
18. WAZU respiration meter
19. Separation installation
20. Holder for chemicals for phosphate precipitation
21. Sludge, flocculated material
22. Effluent originating from the flocculation installation, positioned downstream of the denitrification reactor
23. Buffer tank
24. Storage of discharged sludge
25. Spray installation
26. Influent pump
27. Static mixer and/or flocculating tank
28. Centrifuge
29. Sludge pump
30. Iron chloride storage
31. Metering pump
32. Effluent originating from the denitrification reactor which recycles to the denitrification reactor
33. Effluent originating from the denitrification reactor which recycles to the nitrification reactor
34. Effluent originating from the separation step, which is positioned downstream of the denitrification reactor, which flows to the nitrification reactor
35. Effluent originating from the separation step, which is positioned downstream of the denitrification reactor, which recycles to the nitrification reactor
36. Effluent originating from the separation step, which is positioned upstream of the denitrification reactor.
37. Effluent from buffer tank (23).

A possible embodiment of the present invention, not limiting the scope of the invention, is illustrated by means of the following example.

EXAMPLE

Fermented manure (i.e., the liquid fraction obtained by centrifugation of anaerobic fermented floating pig manure) is treated in the apparatus shown in FIG. 11 consisting of a nitrification reactor (9) having a usable volume of 50 m$^3$, a separator (19) consisting of a pipe flocculator (27) and a centrifuge (28) and two denitrification reactors which are positioned parallel to each other each having a usable sludge bed volume of 10 m$^3$.

The nitrification reactor in this example is a fed batch reactor with a stepwise addition (0.2 m$^3$ of manure per step) of fermented manure. A total of 2 m$^3$ of manure is added in ten steps.

In the total cyclus of the nitrification reactor 8 m$^3$ of effluent of the denitrification reactor is supplied proportionally distributed in the time. After a total of 2 m$^3$ fermented manure has been introduced in a nitrification reactor and all ammonium nitrogen has been nitrificated, the aeration is ended and the active sludge is allowed to sediment during sixty minutes. After the sedimentation period, 10 m$^3$ of the supernatant liquid is discarded as an effluent of the nitrification reactor. Then a new cyclus is started wherein again 2 m$^3$ of fermented manure and 8 m$^3$ of effluent of the denitrification reactor are added, A WAZU respiration meter (trademark RA-1000; marketed by Manotherm) is coupled to the nitrification reactor to monitor the actual respiration velocity. Further, the oxygen concentration in the nitrification reactor is monitored with an oxygen sensor.

After the addition of 0.2 m$^3$ of fermented manure the actual respiration velocity increases and the oxygen concentration in the nitrification reactor decreases. When the ammonium hydrogen added with the fermented manure is nitrificated the actual respiration velocity decreases to the basis level and the oxygen concentration in the nitrification reactor increases. After falling underneath the set point for the respiration velocity and/or exceeding of the set point of the oxygen concentration, another 0.2 m$^3$ of fermented manure is added to the nitrification reactor. FIG. 12 gives the oxygen concentration in the nitrification reactor as a function of the time. The average dose of the fermented manure in the present nitrification reactor was in this test about 10 m$^3$ a day.

The pH-value is also measured in the nitrification reactor. Lime milk is supplied when the pH-value is below 6.5.

The temperature is also monitored and is kept at a value below 33° C. by means of a heat exchanger.

From the oxygen consumption of the substrate during a cyclus (the cumulative actual respiration velocity minus the cumulative basis respiration velocity) it can be calculated that the concentration of nitrificible nitrogen in the fermented manure is 6000 mg N/l. The effluent of the nitrification reactor has a nitrate-N concentration of 1100 mg N/l and a phosphate-P concentration of 25 mg P/l. The nitrogen-N concentration is lower than could be expected on the basis of the dilution of the reactor contents with effluent of the denitrification reactor. This is the consequence of some denitrification in the nitrification reactor during the sedimentation period and the incorporation of nitrogen in the biomass.

The effluent of the nitrification reactor is pumped through a pipe flocculator. At the beginning of this flocculator a 41 w. % (weight/weight) solution of FeCl$_3$ (ferric chloride, iron trichloride) is dosed in an amount of 2.5 l per m$^3$ effluent of the nitrification reactor. In the middle of the pipe flocculator lime milk and/or caustic soda is supplied until the pH-value has reached 5.8. At the end of the pipe flocculator polyelectrolyte is dosed (76 mg per m$^3$ effluent of the nitrification reactor). The liquid then passes through a centrifuge separating in a sludge stream and a liquid stream. The nitrate-N and phosphate-P concentration in the effluent of the centrifuge amount 1100 mg N/l and <0.5 mg P/l, respectively.

The effluent of the centrifuge is then put through the two denitrification reactors that have been arranged parallel. Methanol is added on the basis of the nitrate concentration in the influent stream. The denitrification process is monitored by means of the gas production (1850 l/h). The pH-value of the denitrification reactors is between 9.0 and 9.3. The temperature is kept below 35° C. by means of a heat exchanger. The effluent of the denitrification reactors is recirculated for 80% and discharged for 20%. Analysis shows a nitrate-N concentration <10 mg N/l and a phosphate-P concentration of <0.5 mg P/l.

Table A shows the quality of the fermented manure before and after treatment in the present apparatus.

TABLE A

|     | in (mg/l) | out (mg/l) | yield % |
| --- | --- | --- | --- |
| COD | 15,000 | 300–900 | 94–98 |
| N   | 6,000 | 0–10 | 99.8–100 |
| P   | 275 | 0–0,2 | 99.9–100 |

Table B illustrates the quality of the effluent obtained.

TABLE B

| COD | 300–900 mg/l |
| --- | --- |
| BOD | 0–10 |
| nitrate | 0–10 |
| ammonium | 0 |
| phosphate | 0–0,2 |
| chloride | 2200 |
| pesticides | cannot be detected |
| PAK | |
| EOCl | |
| AOX | |

We claim:

1. Method for processing manure, wherein fermented liquid manure is subjected to nitrification in a first step in an aerated nitrification reactor containing active sludge rich in nitrifying bacteria used in the nitrification step, acid-neutralizing chemicals being added to said nitrification reactor if necessary, and the effluent of the liquid manure from the nitrification reactor is then subjected to dentrification in a subsequent step in a continuously fed upflow sludge bed denitrification reactor containing a very compact biomass which is capable of converting nitrate to nitrogen gas and to which an organic substrate is added for use in the denitrification step, wherein the loading of the nitrification reactor is controlled to obtain optimal nitrification and denitrification on the basis of at least one of the following data:
    the incoming nitrogen load;
    the information from a WAZU respiration meter;
    the oxygen concentration in the nitrification reactor;

the pH in the nitrification reactor being maintained in a range of from about 6 to about 8.5;

the temperature in both the nitrification reactor and the denitrification reactor being kept below 40° C.;

the concentration of oxidized nitrogen in the influent for the denitrification reactor being between 0 and 4 g N/l;

the concentration of oxidized nitrogen in the sludge/liquid mixture in the nitrification reactor being between 0 and 4 g N/l;

the concentration of the carbon source in the effluent from the denitrification reactor; and/or the gas production in the denitrification reactor.

2. Method according to claim 1, wherein the effluent from the nitrification reactor is first passed through a physical/chemical flocculation installation.

3. Method according to claim 2, wherein the flocculating substance used is a substance which contains cations which can precipitate with phosphate.

4. Method according to claim 3, wherein iron chloride is used as a flocculating substance.

5. Method according to claim 2, wherein part of the effluent after denitrification is recycled into the effluent from the nitrification reactor before this flows into the denitrification reactor.

6. Method according to claim 1, wherein liquid is recycled from the reactor where denitrification takes place to the nitrification reactor where nitrification takes place.

7. Method according to claim 6, wherein the recycled liquid is passed through a spray installation before the liquid reaches the nitrification reactor.

8. Method according to claim 1, wherein the nitrification reactor used is a batch reactor.

9. Method according to claim 1, wherein chemicals for phosphate precipitation are added to the denitrification reactor.

10. Method according to claim 9, wherein at least one of the chemicals for phosphate precipitation is selected from the group consisting of: $Ca^{2+}$, $Fe^{3+}$, $Mg^{2+}$ and $Al^{3+}$.

11. Method according to claim 1, wherein methanol is added as organic substrate to the denitrification reactor.

12. Method according to claim 1, wherein glycol is added as organic substrate to the denitrification reactor.

13. Method according to claim 1, in which an organic substance or a mixture of organic substances is added to the denitrification reactor, wherein the ratio between chemical oxygen consumption and total organic carbon (COC/TOC ratio) of more than or equal to 3.75 is maintained.

14. Method according to claim 1, wherein at least one acid-neutralizing chemical is added to the nitrification reactor.

15. Method according to claim 14, wherein lime is added.

16. Method according to claim 1, wherein the concentration of oxidized nitrogen in the influent for the dentrification reactor is maintained at from about 1.0 to about 1.4 g N/l.

17. Method according to claim 1, wherein the concentration of oxidized nitrogen in the nitrification reactor is maintained at from about 0 to about 1.5 g N/l.

18. Method for processing manure, wherein fermented liquid manure is subjected to nitrification in a first step in an aerated nitrification reactor containing active sludge rich in nitrifying bacteria, acid-neutralizing chemicals being added to said nitrification reactor if necessary, and the effluent of the liquid manure from the nitrification reactor is then subjected to denitrification in a subsequent step in a continuously fed upflow sludge bed denitrification reactor containing a very compact biomass for converting nitrate to nitrogen gas and to which an organic substrate is added, the temperature in both the nitrification reactor and the dentrification reactor being kept below 40° C. and the pH in the nitrification reactor being maintained in a range from about 6 to about 8.5;

wherein the loading of the nitrification reactor is controlled to obtain optimal nitrification and denitrification on the basis of the following parameters:

the incoming nitrogen load by controlling the fermented liquid manure;

the incoming oxygen load by controlling aeration;

the information from a WAZU respiration meter or the oxygen concentration in the nitrification reactor;

maintaining the concentration of oxidized nitrogen in the sludge/liquid mixture in the nitrification reactor between 0 and 4 g N/l;

and wherein the loading of the denitrification reactor is controlled to obtain optimal denitrification on the basis of the following parameters:

maintaining the concentration of oxidized nitrogen in the the influent for the denitrification reactor between 0 and 4 g N/l;

maintaining the incoming oxidized nitrogen load below or equal to the nitrate removal capacity so the nitrate concentration in the effluent from the nitrification reactor is below 4 g N/l;

the amount of the organic substrate added being calculated on the basis of at least one of the incoming oxidized nitrogen load, the gas production in the denitrification reactor or nitrate effluent concentration.

19. Method according to claim 18, wherein the concentration of oxidized nitrogen in the sludge/liquid mixture in the nitrification reactor is maintained between 0 and 4 g N/l by adjusting the ratio of the influent flow of fermented liquid manure and/or by adjusting the recirculation flow.

20. Method according to claim 18, wherein the amount of the organic substrate added is calculated on the basis of the incoming oxidized nitrogen load.

21. Method according to claim 18, wherein the loading of the denitrification reactor is further controlled to obtain optimal denitrification on the basis of monitoring the nitrate removal on the basis of at least one of the gas production in the denitrification reactor and/or the nitrate effluent concentration.

* * * * *